3,480,863
RECEIVER SYSTEM HAVING VISUAL INDICATOR FOR CHANGES IN ELECTRICAL STATE
Albert Hopengarten, Lafayette Hill, Pa., assignor to Electrosonics International, Inc., Philadelphia, Pa., a corporation of Pennsylvania
Filed Sept. 1, 1964, Ser. No. 393,627
Int. Cl. G01r 19/14, 31/02
U.S. Cl. 324—133                                    17 Claims

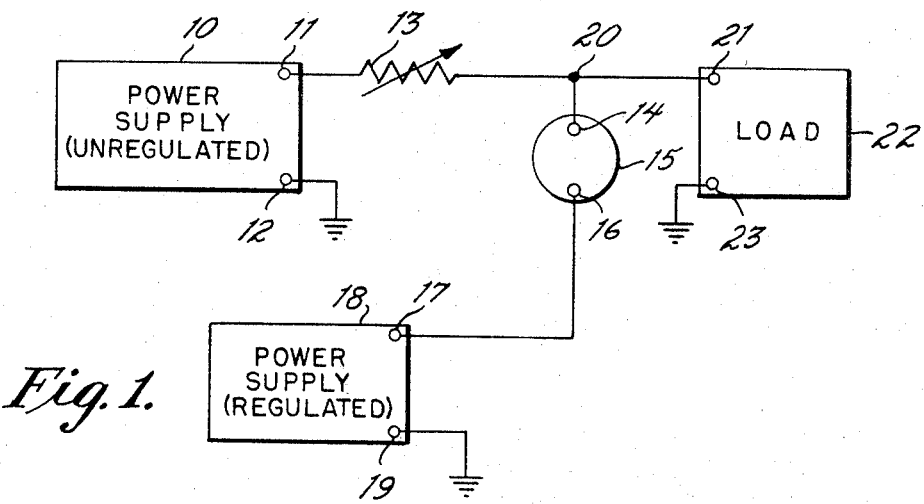
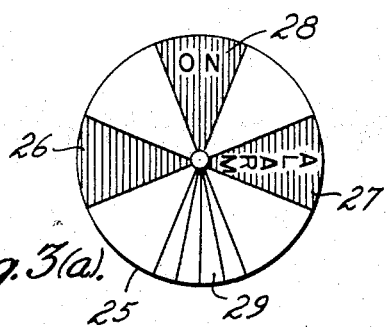
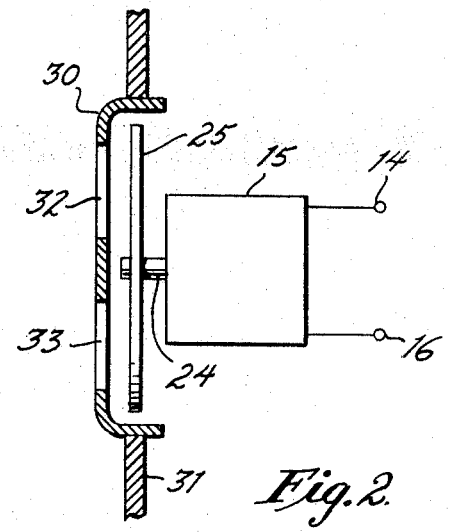
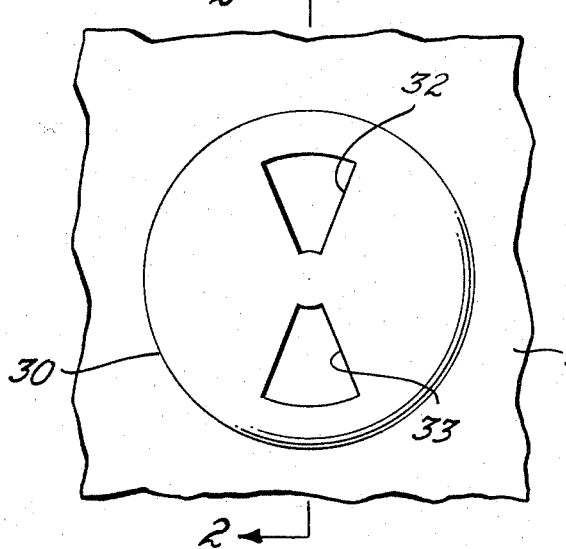
INVENTOR
ALBERT HOPENGARTEN
BY
McClure & Weiser
ATTORNEYS United States Patent Office 3,480,863
Patented Nov. 25, 1969

ABSTRACT OF THE DISCLOSURE

An alerting receiver system having an unalerted standby state and having an alerted state produced by reception of an alarm or alerting signal is provided with a device indicative of power supply potential and of whether the system is in alerted or unalerted state.

---

This invention relates to an indicator system for providing visual indications of variations in the states of certain electrical circuits.

In radio receivers which are designed to operate, not in response to continuous transmissions, but rather in response to intermittent transmissions occurring at unpredictable intervals, it is desirable to provide apparatus which presents a distinctive visual indication of the reception of such a transmission. In addition, because such receivers are often employed under circumstances in which the availability of a perfectly steady and reliable supply of electrical operating power is not assured, it is also desirable to monitor and to provide visual indications of variations in the characteristics of this supply and particularly of the voltage which it provides for the operation of the receiver.

The reception of a signal by a receiver of the type under consideration produces a change in the state of certain circuits within the receiver. For example, it may render conductive certain receiver transistors which are non-conductive during intervals when the receiver is awaiting a transmission.

Devices have been proposed, in the prior art, for sensing such a change in conductivity attendant upon a change in circuit state and for providing a visual indication thereof. Devices have also been proposed for sensing changes in supply voltage and for providing a visual indication of these. However, where the same indicator has been employed for both of the above-described functions, this has normally involved the use of switches or relays to transfer the indicator from one function to the other.

This presented the drawback that switches are unreliable and also consume appreciable electrical power. The latter is especially harmful in receivers intended to operate for long periods of time on a self-contained power supply of limited capacity.

It is therefore a principal object of the invention to provide an improved system for indicating a change in state of a circuit and also variations in power supply voltage.

It is another object to provide such an indicator system which is free from the need for switches to change from one function to the other.

It is still another object to provide such an indicator system which is exceptionally simple and trouble-free.

These and other objects which will appear are achieved by a system which includes a meter capable of deflection in opposite directions in response to traversal by currents of opposite polarities. This meter is connected in series between the power supply whose voltage variations are to be detected and a power supply of lower, but substantially constant voltage. The polarities of these supplies are such as to cause currents to flow in opposite directions through the meter. Shunted across both the meter and the constant voltage supply is a circuit element providing substantially different conductivity after reception of a transmission than while awaiting such transmission.

The meter itself preferably has an indicating disk rotatable in opposite directions in response to meter deflections in opposite directions. Interposed between this disk and the observer is an opaque mask with wedge-shaped, transparent portions. Certain segments of the rotatable disk which are visible through the transparent mask portions when the shunt element has the conductivity corresponding to the awaiting of a transmission are marked to provide indications of power supply voltage. Other segments of the disk, which become visible when said element has the conductivity which it assumes after reception of a transmission, are marked in a distinctively different manner, thus enabling the observer to distinguish readily between the circuit state corresponding to the awaiting of a transmission and to the reception of same.

For further details reference may be had to the accompanying drawings wherein
FIGURE 1 is a diagram, partly in block diagram form, of the electrical components included in a preferred embodiment of the invention;
FIGURE 2 is an elevation, partly in section, of certain mechanical elements also forming part of said preferred embodiment; and
FIGURES 3(a) and 3(b) are front views of certain portions of FIGURE 2.

The same reference numerals are used to designate corresponding elements in all the figures.

Referring to FIGURE 1, block 10 represents the principal source of D-C operating power of the receiver of which all the apparatus shown in all of the figures forms a part. This power source, or supply 10 may be of any conventional form, consisting, for example, of a conventional rectifier circuit for rectifying the alternating voltage normally available from electrical power distribution networks. Alternatively, the power supply 10 may be the battery contained within the receiver itself, which renders the receiver independent of external power sources.

In any event, the voltage developed at terminals 11 and 12 of this power supply 10 is unregulated, which means that it is subject to fluctuation in magnitude in response to variations in the condition of the power supply. For example, in the case of a battery, the voltage at terminals 11 and 12, which may correspond to the actual binding posts of the battery, decreases as the charge stored in the battery declines during use.

A variable resistor 13 is connected in series between supply terminal 11 and terminal 14 of an electrical meter movement 15. The other terminal 16 of this meter movement is connected to one output terminal 17 of a second power supply 18, whose other output terminal 19 is grounded.

Power supply 18, unlike power supply 10, is intended to develop a fixed value of D-C output voltage. This power supply 18 may also take a variety of conventional forms, all characterized in that its operating voltage is derived from power supply 10 and appropriately operated on within supply 18 to transform the same into a voltage which remains substantially constant over a considerable range of variations of the voltage provided by power supply 10.

For both power supplies, the same polarity terminal is connected to ground, e.g., the less positive terminal of each. Obviously, however, neither these ground connections, nor the other connections shown are unique, but others which accomplish the same objects may be used.

The junction point 20 between resistor 13 and meter movement 15 is connected to one terminal 21 of a load circuit 22, whose other terminal 23 is grounded.

Load circuit 22 may take any one of a number of conventional forms capable of providing low conductivity, preferably approaching zero, between terminals 21 and 23 while the receiver is in that state in which it is awaiting the beginning of a transmission, while providing a much higher conductivity, preferably approaching infinity, between said terminals in response to said transmission.

In a preferred form this load circuit 22 may consist of the emitter-collector circuit of a transistor whose base is supplied with a signal which maintains the transistor at cut-off while awaiting the receipt of a transmission, and with a signal which drives the transistor into saturation upon reception of such a signal. Moreover, the latter state is preferably maintained until a manual reset operation is performed, denoting recognition of such reception by the human attendant.

Circuitry capable of providing this transistor control signal is well known. In view of this and in view of the fact that it does not form an integral part of the present invention, this circuitry is not further described herein.

In FIGURE 2, to which reference may now be had, there is shown a side elevation of the meter movement 15 of FIGURE 1, together with its terminals 14 and 16. This meter movement is also provided with a shaft 24, rotatable both clockwise and counterclockwise, depending upon the polarity of the current flowing between terminals 14 and 16, through angles determined, in each case, by the intensity of that current.

This meter movement may be of any conventional form, as for example, a so-called moving magnet meter.

Concentrically mounted on shaft 24 is a circular disk 25, a full-face view of which is shown in FIGURE 3(a). As shown in FIGURE 3(a) this disk is divided by diametral lines into eight segments, of approximately equal sizes. Two diametrically opposed ones of these segments, designated by reference numerals 26 and 27 in FIGURE 3(a), are colored red and one of them (segment 27) is labeled with the word "ALARM."

One of the segments positioned at right angles to segments 26 and 27 and designated 28 in FIGURE 3(a) is also colored red, but labeled with the word "ON."

The segment 29, diametrically opposite segment 28, has a white background on which are drawn several black radial lines, spaced equally from each other.

The remaining four segments on disk 25 are white and unmarked.

Returning again to FIGURE 2, in front of disk 25, there is a circular mask 30, mounted in an opening in the control panel 31 of the receiver of which all of the apparatus under discussion forms part.

As shown in FIGURE 3(b), which is a full-face view of mask 30 and the surrounding portion of control panel 31, that mask has two apertures 32 and 33 in the form of diametrically opposed wedges, through which diametrically opposed wedge-shaped portions of the disk 25 are visible to an observer of the control panel.

The apparatus described above operates as follows.

When the receiver of which it forms part is turned off, power is disconnected from all the circuitry illustrated (by means of a conventional off-on switch, not shown). In this condition, no current flows through meter movement 15 and the shaft 24 and its attached disk 25 assume an undeflected position such that the white-faced wedge between wedges 27 and 28 is lined up with aperture 32 and the diametrically opposed white-faced wedge with aperture 33.

When the receiver is turned on, and before any alarm signal is received, load 22 is in its low conductivity, i.e., high impedance condition. In that condition, and assuming that power supply 10 is providing either its rated output voltage or at least an output voltage not seriously below that rating that output voltage will exceed the lesser output voltage of power supply 18. Consequently current will flow through meter movement 15 in one direction and the disk 25 will be rotated in a clockwise direction from the position it occupies while the receiver is turned off.

The various circuit components are so proportioned that the resulting disk rotation will be sufficient to bring wedge 28 into line with aperture 32 and, likewise, wedge 29 into line with aperture 33. The greater the voltage from supply 10, the greater the clockwise rotation. The extent of this rotation can be gauged by the radial markings on wedge 29 whose positions within the frame provided by aperture 33 indicate this extent and with it the voltage provided by supply 10. This, therefore, provides a convenient meter indication of the condition of supply 10. This information is especially important when supply 10 is in the form of a battery whose state of charge can thus be ascertained by a glance at aperture 33.

As indicated previously, when an alarm signal is received the impedance of load 22 suddenly assumes a different value, substantially lower than before reception of that signal.

Under those circumstances, the current drawn from power supply 18 through meter movement 15 suddenly increases, whereas that drawn from supply 10 through the same movement is changed comparatively slightly. Since the current from supply 18 flows through the meter movement in a direction opposite to that of the current from supply 10, the direction of current flow through that meter movement thereupon reverses and continues in the reverse direction for as long as load 22 remains in its low impedance state.

This reversal of current flow also causes rotation of the disk 25 in a direction opposite to that in which it had rotated upon turning on of the receiver, but before reception of the alarm signal. This reverse rotation causes the wedge 27 to come into alignment with aperture 32 and the opposing wedge 26 into alignment with aperture 33.

Thus there become visible in these apertures two red-colored areas, at least one of which bears the word "ALARM."

Preferably, mechanical stops of any conventional form are provided for limiting the rotation of disk 25 in either direction to an extent where either wedge 28 or wedge 27 is fully aligned with aperture 32. Moreover the components of the circuit shown in FIGURE 1 should be so proportioned that attainment of its rated voltage by supply 10, and reduction of the impedance of load 22 by an alarm signal, each causes a rotation sufficiently extensive to drive the disk to its respective limit of rotation. The variable resistor 13 of FIGURE 1 serves as a calibrating resistor in this connection, enabling the extent of the meter deflection to be readily adjusted for any given relationship between the output voltages of the two power supplies.

When the receiver of which the apparatus shown in the drawings forms a part is then reset, in readiness for the reception of a new alarm signal, the impedance of load 22 reverts to its original high value, the direction of current flow through meter movement 15 reverts back to its original direction, and the disk 25 rotates back into the position in which it exposes to view through aperture 32 the wedge marked "ON" and through aperture 33 the wedge marked with radial lines indcating the output voltage of supply 10.

I claim:
1. An electrical metering system comprising:
a first power supply providing a unidirectional output voltage subject to undesired variations upon change in load impedance;
a second power supply providing a unidirectional output voltage lower than that of said first power supply and substantially constant despite change in load impedance;
an electrical meter connected between said power supplies, said meter being responsive to traversal by current drawn preponderantly from respective ones of said supplies to provide respectively different indications;

and means controllable to cause different ones of said currents to preponderate in traversing said meter, including a radio receiver constituting variable-impedance means shunting the series combination of one of said power supplies and said meter and having a quiescent or standby state characterized by high input impedance and having an alternative alarm or alerted state characterized by low input impedance.

2. The system of claim 1 characterized in that said first and second power supplies are so connected to said meter as to produce respectively current flow in opposite directions through said meter.

3. The system of claim 2 characterized in that said second power supply is a regulated power supply drawing its operating power from said first power suply.

4. The system of claim 2 characterized in that said variable impedance means shunts the series combination of said second power supply and said meter.

5. The system of claim 1 further characterized in that said variable impedance means is controllable to alternate between conditions of substantially infinite and substantially zero impedance.

6. The system of claim 5 further characterized in that said variable impedance means changes from its condition of substantially infinite to substantially zero impedance in response to reception of an alarm or alerting signal and from its condition of substantially zero to substantially infinite impedance in response to manual resetting.

7. The system of claim 2 further characterized in that said meter is a moving magnet meter.

8. In radio apparatus normally in quiescent or standby state but responsive to transmission of an alarm or alerting signal, the combination of an unregulated D-C power supply and a regulated D-C power supply connected in bucking relationship, a meter interconnected between output terminals of the respective power supplies and indicative of the direction of the potential gradient therebetween, and a variable-impedance load interconnected to the output terminals of both power supplies and comprising a radio receiver having a quiescent state in which it is characterized by a high input impedance and having also an alternative alerted state in which it is characterized by a low input impedance and being adapted to be switched from quiescent to alerted state by reception of an alarm or alerting signal, the unregulated power supply having an output potential normally higher than the output potential of the regulated power supply during the quiescent state of the receiver and lower than the output potential of the regulated power supply during the alerted state of the receiver.

9. Apparatus according to claim 8, wherein the meter is also indicative of the slope of the potential gradient between the output terminals of the respective power supplies.

10. Apparatus according to claim 8, wherein the meter and regulated power supply interconnected in series are shunted across the unregulated power supply as well as the load receiver.

11. Apparatus according to claim 8 further characterized in that said meter is deflectable in opposite directions in response to current flow in said opposite directions respectively.

12. Apparatus according to claim 11 further characterized in that said meter comprises a circular disk rotatable in opposite directions in response to said opposite currents.

13. Apparatus according to claim 12 further comprising a mask spaced from and paralleling said disk, said mask having at least one aperture through which a portion of said disk is visible.

14. Apparatus according to claim 13 further characterized in that said disk is divided into a plurality of wedge-shaped segments, said aperture being shaped so as to conform substantially to each of said segments.

15. Apparatus according to claim 13 characterized in that said mask is stationary.

16. Apparatus according to claim 15 further characterized in that said mask has a second aperture through which is visible an area of said disk diametrically opposite that visible through said first-mentioned aperture.

17. Apparatus according to claim 16 characterized in that wedges of said disk visible through said apertures in response to rotation of said meter in opposite directions are provided with distinctively different markings.

References Cited

UNITED STATES PATENTS

| 1,130,633 | 3/1915 | Roller | 324—133 XR |
| 2,367,299 | 1/1945 | McLarn et al. | |
| 3,094,652 | 6/1963 | Zoppi et al. | 322—99 XR |
| 3,202,901 | 8/1965 | Peras | 322—99 XR |
| 3,305,773 | 2/1967 | Beaty | 324—51 |
| 3,305,774 | 2/1967 | Heath | 324—51 |
| 2,229,009 | 1/1941 | Berry | 324—157 XR |
| 2,874,354 | 2/1959 | Bell | 324—131 XR |
| 3,258,693 | 6/1966 | Meyer | 324—133 XR |

GERARD R. STRECKER, Primary Examiner

U.S. Cl. X.R.

324—51; 325—363; 340—248